US012237634B2

(12) United States Patent
Jushchyshyn et al.

(10) Patent No.: US 12,237,634 B2
(45) **Date of Patent: *Feb. 25, 2025**

(54) WEDGE CABLE CONNECTOR

(71) Applicant: Burndy, LLC, Manchester, NH (US)

(72) Inventors: Jeremy Jushchyshyn, Willow Grove, PA (US); Nicholas Polidori, Medford, NJ (US); Michael Bucciero, Pennsauken, NJ (US)

(73) Assignee: BURNDY, LLC, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,497

(22) Filed: Jul. 24, 2023

(65) Prior Publication Data

US 2023/0369783 A1 Nov. 16, 2023

Related U.S. Application Data

(63) Continuation of application No. 17/156,225, filed on Jan. 22, 2021, now Pat. No. 11,749,914.

(60) Provisional application No. 62/964,506, filed on Jan. 22, 2020.

(51) Int. Cl.
*H01R 4/50* (2006.01)
*H01R 4/38* (2006.01)

(52) U.S. Cl.
CPC ............. *H01R 4/5091* (2013.01); *H01R 4/38* (2013.01)

(58) Field of Classification Search
None
See application file for complete search history.

(56) References Cited

U.S. PATENT DOCUMENTS 2,858,522 A 10/1958 Wengen et al.
3,275,974 A 9/1966 Mixon
3,462,543 A 8/1969 Wahl et al.
3,512,447 A 5/1970 Vaughn
4,027,939 A 6/1977 White
(Continued)

FOREIGN PATENT DOCUMENTS

WO 1998027621 6/1998
WO 2018208540 11/2018

OTHER PUBLICATIONS

CPI Products Inc, Pad Tap Connector Brochure, www.connectorproducts.com, May 2012 (2 pages).
(Continued)

*Primary Examiner* — Felix O Figueroa
(74) *Attorney, Agent, or Firm* — Wissing Miller LLP

(57) ABSTRACT

An electrical connector adapted to electrically and mechanically connect a main conductor to a bail or tap conductor includes a C-shaped frame having a curved top wall adapted to fit over a main conductor and a curved bottom wall adapted to receive a bail or tap conductor. A fastener-operated wedge assembly is carried within the frame between a conductor receiving position and a conductor clamping position. The wedge assembly has a wedge body with a primary contact surface adapted to contact the main conductor and a secondary contact surface adapted to contact the bail or tap conductor when the wedge body is moved from the conductor receiving position to the conductor clamping position. The fastener positively moves the wedge body between the positions so that the clamping action of the connector can be tightened or loosened as desired.

25 Claims, 9 Drawing Sheets

(56) References Cited

U.S. PATENT DOCUMENTS

| | | | | |
|---|---|---|---|---|
| 4,114,977 | A | 9/1978 | Polidori | |
| 4,415,222 | A | 11/1983 | Polidori | |
| 4,600,264 | A | 7/1986 | Counsel | |
| 4,627,774 | A | 12/1986 | Bradley | |
| 5,092,797 | A | 3/1992 | Cole et al. | |
| 5,340,335 | A | 8/1994 | Haun | |
| 5,419,667 | A | 5/1995 | Avgoustis | |
| 5,772,252 | A | 6/1998 | Malani | |
| 6,045,414 | A | 4/2000 | DeFrance | |
| 6,739,631 | B2 | 5/2004 | Smith et al. | |
| 6,817,909 | B2 | 11/2004 | Dobrinski et al. | |
| 7,179,034 | B2 | 2/2007 | Ladouceur | |
| 7,641,522 | B2 | 1/2010 | Carcangiu et al. | |
| 7,993,169 | B1 | 8/2011 | Hoxha | |
| 8,402,641 | B2 | 3/2013 | Johnson et al. | |
| 8,668,419 | B2 | 3/2014 | Hardt et al. | |
| 8,696,274 | B2 | 4/2014 | Kim et al. | |
| 10,465,732 | B2 | 11/2019 | Polidori | |
| 11,749,914 | B2 * | 9/2023 | Jushchyshyn | H01R 4/5091<br>439/807 |
| 2012/0214355 | A1 | 8/2012 | De France | |
| 2013/0078873 | A1 | 3/2013 | La Salvia et al. | |
| 2018/0258975 | A1 | 9/2018 | Polidori | |
| 2018/0331435 | A1 | 11/2018 | Murugiah et al. | |
| 2018/0342818 | A1 | 11/2018 | Johnson et al. | |
| 2022/0069485 | A1 * | 3/2022 | Polidori | F16B 2/14 |

OTHER PUBLICATIONS

CPI Products Inc, Products for the Rail and Utility Industry Catalog, Version 9.1, Oct. 2016, 112 total pgs. (See, pp. 4-17; 19-21, 32, 34-39 and 44-49).

AFL, Taplink Connectors Brochure, www.AFLglobal.com, Nov. 25, 2019 (2 pages).

International Search Report and Written Opinion mailed in corresponding International Application PCT/US2021/14749 on Apr. 15, 2021 (10 pages).

International Preliminary Report on Patentability mailed in corresponding International Application PCT/US2021/014749 on Aug. 4, 2022 (8 pages).

* cited by examiner

WEDGE CABLE CONNECTOR

CROSS REFERENCE TO RELATED APPLICATIONS

The present application is a continuation of co-pending U.S. application Ser. No. 17/156,225 filed Jan. 22, 2021, which is based on and claims benefit from U.S. Provisional Patent Application No. 62/964,506 filed on Jan. 22, 2020, the entire contents of each are incorporated herein by reference.

BACKGROUND

Field

The present disclosure relates generally to electrical connectors. More particularly, the present disclosure relates to wedge type electrical connectors adapted to electrically and compressively interconnect electrical transmission conductors and distribution conductors.

Description of the Related Art

Wedge type electrical connector assemblies are known in the art. Electrical connectors may be adapted to electrically and mechanically connect conductors within a transmission or distribution circuit. For example, a typical electrical connector may be used to connect a main conductor to a tap or run conductor. An electrical connector adapted to connect a transmission conductor or a tap conductor to another conductor may be referred to as a tap connector. Wedge type tap connectors typically include a C-shaped body having a curved top wall adapted to fit over a main conductor. A bolt-operated wedge is carried by the bottom of the C-shaped body and may include an elongated recess in the top for supporting the tap conductor. A conductor interface has a handle thereon which allows the interface to be easily placed within the C-shaped connector body between the conductors. The bolt positively moves the wedge both in and out of the C-shaped body so that the clamping action of the connector can be tightened or loosened as desired.

SUMMARY

The present disclosure provides exemplary embodiments of wedge type electrical connector assemblies adapted to electrically and mechanically connect conductors within transmission and/or distribution circuits. The wedge type electrical connector assemblies according to the present disclosure integrate a conductor interface with a fastener activated wedge to reduce the number of components forming the connector assembly and creating the electrically conductive between the electrical conductors.

In an exemplary embodiment, a wedge type electrical connector assembly includes a C-shaped frame having a curved top wall adapted to fit over a main conductor and a curved bottom wall adapted to receive a bail or tap conductor. A fastener-operated wedge assembly is carried within the frame between a conductor receiving position and a conductor clamping position. The wedge assembly has a wedge body with a primary contact surface adapted to contact the main conductor and a secondary contact surface adapted to contact the bail or tap conductor when the wedge body is moved from the conductor receiving position to the conductor clamping position. The fastener positively moves the wedge body between positions so that the clamping action of the connector can be tightened or loosened as desired. A head portion of the fastener may include a breakaway feature to help prevent over tightening of the fastener.

In another exemplary embodiment, the wedge type electrical connector assembly includes a frame and a wedge assembly. The frame includes first conductor guide wall, a second conductor guide wall, a rear wall between the first conductor guide wall and the second conductor guide wall, and a front wall extending from the second conductor guide wall in a direction toward the first conductor guide wall. The guide walls, rear wall and front wall form a wedge receiving channel. The front wall has a longitudinal track accessible from the wedge receiving channel, and the rear wall has a mounting member extending therefrom. The wedge assembly has a wedge and a fastener. The wedge includes a body shaped to fit within the wedge receiving channel of the frame, a fastener holder extending from a first side wall of the body and a guide rail extending from a second side wall of the body. The guide rail is adapted to interact with the track. The body has a top wall with a primary contact surface and a bottom wall with a secondary contact surface. The primary contact surface is adapted to contact a main conductor in contact with the first conductor guide wall, and the secondary contact surface is adapted to contact a bail or a tap conductor in contact with the second conductor guide wall.

In another exemplary embodiment, the wedge type electrical connector assembly includes a frame and a wedge assembly. The wedge type electrical connector assembly may also include a bail positioned within the frame. The frame includes a first conductor guide wall, a second conductor guide wall, a rear wall between the first conductor guide wall and the second conductor guide wall, and a front wall extending from the second conductor guide wall in a direction toward the first conductor guide wall. The guide walls, rear wall and front wall form a wedge receiving channel. The front wall has a longitudinal track accessible from the wedge receiving channel, and the rear wall has a mounting member, e.g., a flange, extending therefrom. If a bail is positioned within the frame, the bail may be positioned within the wedge receiving channel of the frame adjacent the second conductor guide wall.

The wedge assembly includes a wedge and a fastener. The wedge includes a wedge-shaped body, a fastener holder and a guide rail. The body is adapted to fit within the wedge receiving channel of the frame. The body has a top wall with a primary contact surface and a bottom wall with a secondary contact surface. The body also has a first side wall between the top wall and the bottom wall, and a second side wall between the top wall and the bottom wall. The fastener holder, e.g., a flange, extends from the first side wall of the body and is positioned to align with the mounting member of the frame when the body is positioned within the wedge receiving channel. The fastener is movably attached to the fastener holder and when the body is positioned within the wedge receiving channel the fastener is operatively engaged with the mounting member so that the fastener can move the body between a conductor receiving position and a conductor clamping position. The guide rail extends from the second side wall of the body and is positioned and adapted to interact with the track to guide the body within the wedge receiving channel when the body is moved between the conductor receiving position and the conductor clamping position.

In another exemplary embodiment, the wedge type electrical connector assembly includes a C-shaped frame and a wedge assembly. The wedge type electrical connector assembly may also include a bail positioned within the frame. The C-shaped frame includes a first conductor guide wall, a second conductor guide wall, a rear wall between the first conductor guide wall and the second conductor guide wall. The C-shaped frame may also include a front wall extending from the second conductor guide wall in a direction toward the first conductor guide wall. The guide walls, rear wall and front wall forming a wedge receiving channel. The front wall has a longitudinal track accessible from the wedge receiving channel, and the rear wall has a mounting member, e.g., a flange, extending therefrom. If a bail is positioned within the frame, the bail may be positioned within the wedge receiving channel of the frame adjacent the second conductor guide wall.

The wedge assembly includes a wedge and a fastener having breakaway head portion. The breakaway head portion has a head nut, a shear stud and a cap nut. The wedge includes a wedge-shaped body, a fastener holder and a guide rail. The wedged-shaped body is adapted to fit within the wedge receiving channel of the frame. The body has a top wall with a primary contact surface and a bottom wall with a secondary contact surface, a first side wall between the top wall and the bottom wall, and a second side wall between the top wall and the bottom wall. The fastener holder, e.g., a flange, extends from the first side wall of the body and is positioned to align with the mounting member of the frame when the body is positioned within the wedge receiving channel. The fastener is movably coupled, mated or attached to the fastener holder so that when the body is positioned within the wedge receiving channel of the frame the fastener is operatively engaged with the mounting member so that the fastener can move the body between a conductor receiving position and a conductor clamping position. The guide rail extends from the second side wall of the body and is positioned and adapted to interact with the track to guide the body within the wedge receiving channel of the frame when the body is moved between the conductor receiving position and the conductor clamping position.

In another exemplary embodiment, the wedge type electrical connector assembly includes a frame, a wedge assembly and a bail positioned within the frame. The frame includes a first conductor guide wall, a second conductor guide wall, a rear wall between the first conductor guide wall and the second conductor guide wall, and a front wall extending from the second conductor guide wall in a direction toward the first conductor guide wall. The guide walls, rear wall and front wall form a wedge receiving channel. The front wall has a longitudinal track accessible from the wedge receiving channel, and the rear wall has a mounting member, e.g., a flange, extending therefrom. The bail may be positioned within the wedge receiving channel of the frame adjacent the second conductor guide wall.

The wedge assembly includes a wedge and a fastener. The wedge includes a wedge-shaped body, a fastener holder and a guide rail. The body is adapted to fit within the wedge receiving channel of the frame. The body has a top wall with a primary contact surface and a bottom wall with a secondary contact surface. The body also has a first side wall between the top wall and the bottom wall, and a second side wall between the top wall and the bottom wall. The fastener holder, e.g., a flange, extends from the first side wall of the body and is positioned to align with the mounting member of the frame when the body is positioned within the wedge receiving channel. The fastener is movably attached to the fastener holder and when the body is positioned within the wedge receiving channel the fastener is operatively engaged with the mounting member so that the fastener can move the body between a conductor receiving position and a conductor clamping position. The guide rail extends from the second side wall of the body and is positioned and adapted to interact with the track to guide the body within the wedge receiving channel when the body is moved between the conductor receiving position and the conductor clamping position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
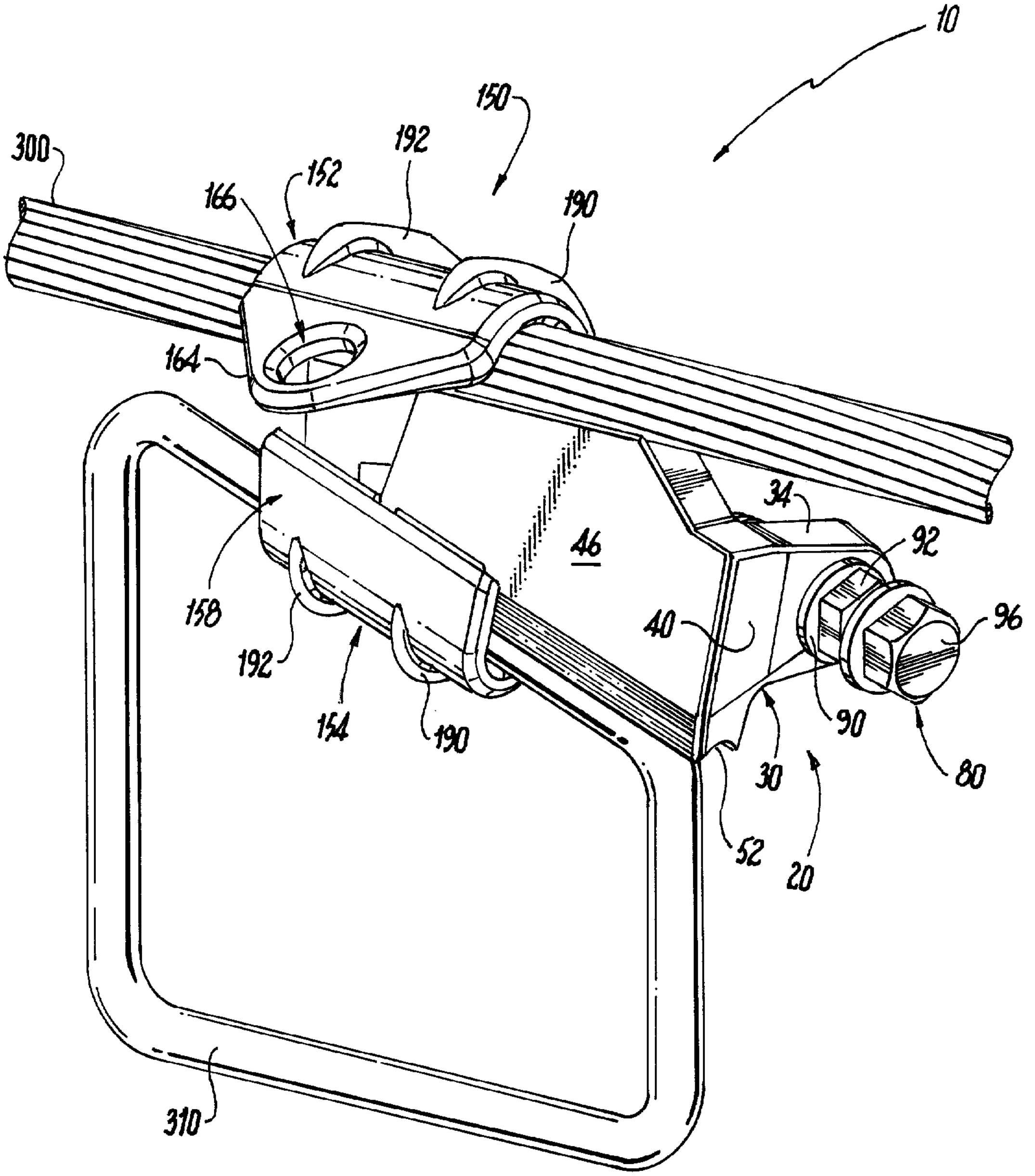
FIG. 1 is a perspective view of an exemplary embodiment of a wedge type electrical cable connector assembly according to the present disclosure, illustrating the electrical cable connector connected to a main conductor and a bail.
Figure 1A:
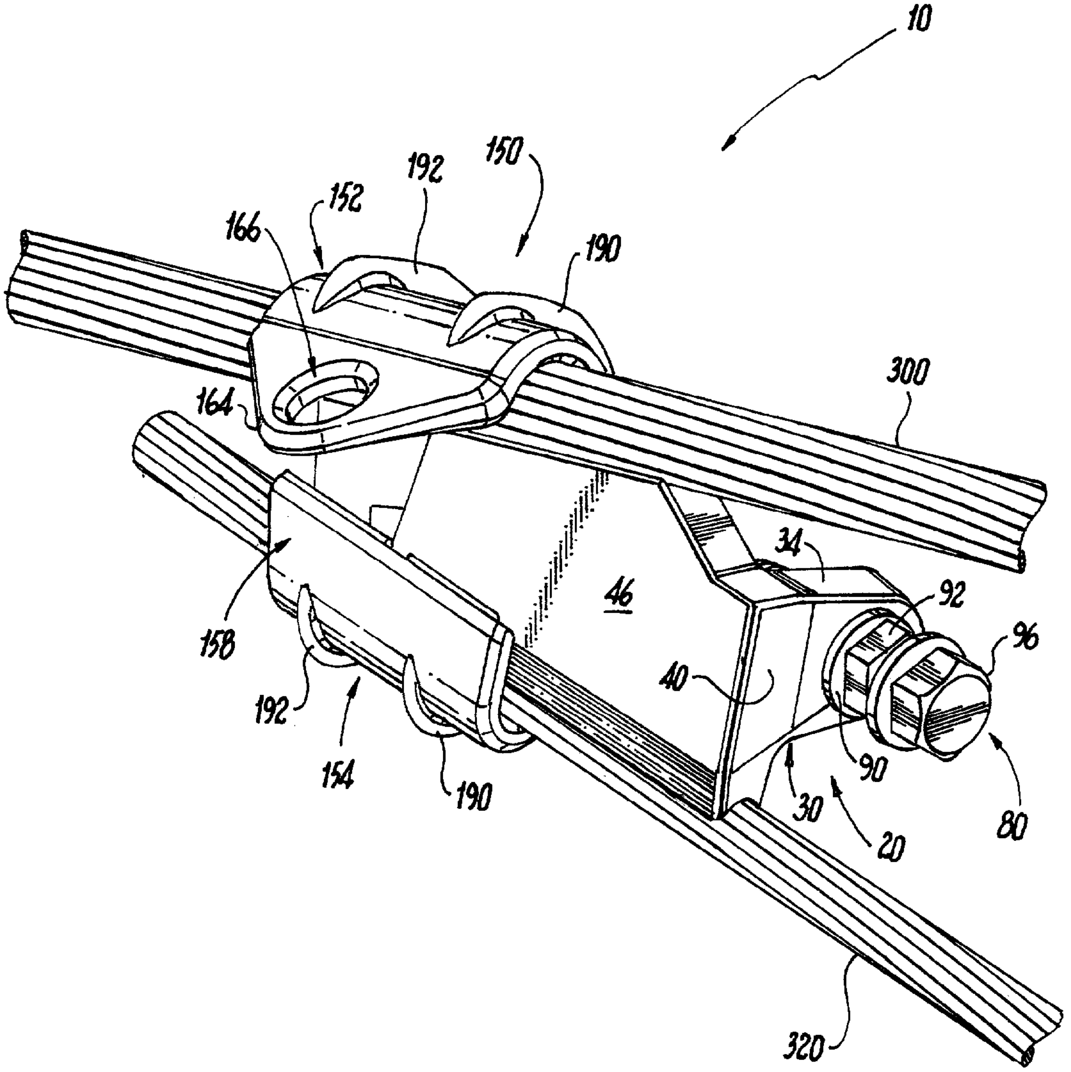
FIG. 1A is a perspective view of the wedge type electrical cable connector assembly according to FIG. 1, illustrating the electrical cable connector connected to a main conductor and a tap conductor.

The present disclosure provides exemplary embodiments of improved wedge type electrical cable connectors adapted to electrically and mechanically connect conductors within a transmission or distribution circuit. The wedge type electrical cable connectors contemplated by the present disclosure include, but are not limited to, wedge type stirrup connectors and wedge type tap connectors. Wedge type stirrup connectors electrically and mechanically connect a main conductor to a bail, as shown in FIG. 1, and wedge type tap connectors electrically and mechanically connect a main conductor to a tap conductor, as shown in FIG. 1A. The wedge type electrical cable connectors according to the present disclosure integrate a conductor interface with a bolt activated wedge assembly to reduce the number of components needed to assemble when attaching a main conductor to a stirrup, or when attaching a main conductor to a tap conductor. For ease of description, the wedge type electrical cable connectors contemplated by the present disclosure may also be referred to herein as the "connectors" in the plural and the "connector" in the singular. The main conductors referenced herein include, for example, transmission line conductors, and the tap conductors referenced herein include, for example, branch and run conductors. For general reference purposes, a main conductor supplies power from either a transmission circuit or a distribution circuit, and a bail or tap conductor distributes power to a distribution circuit or a load.

Referring to FIG. 1, an exemplary embodiment of a connector 10 according to the present disclosure is shown electrically and mechanically connecting a main conductor 300 to a stirrup or bail 310. The connector 10 includes a wedge assembly 20 and a frame 150. In some embodiments, the connector 10 may also include the bail 310. The wedge assembly 20 is operatively coupled to or interconnected with the frame 150 so that the wedge assembly 20 can slide or glide along the frame 150 to wedge or secure a main conductor 300 to a bail 310 so that the main conductor 300 and bail 310 are electrically and mechanically connected as will be described below. The wedge assembly 20 and frame 150 are made of an electrically conductive material that has sufficient rigidity to withstand the forces applied by the wedge assembly 20 against the frame 150 when mechanically connecting the main conductor 300 to a bail 310. Non-limiting examples of such electrically conductive and rigid materials include aluminum, aluminum alloys, stainless steel, galvanized steel, copper and copper/brass alloys. It is noted that the exemplary embodiment shown in FIG. 1A, the connector 10 electrically and mechanically connects a main conductor 300 to a tap conductor 320. However, in either embodiment the structure, function and operation of the connector 10 is substantially the same and will be described herein in relation to the embodiment of FIG. 1.

Figure 2:
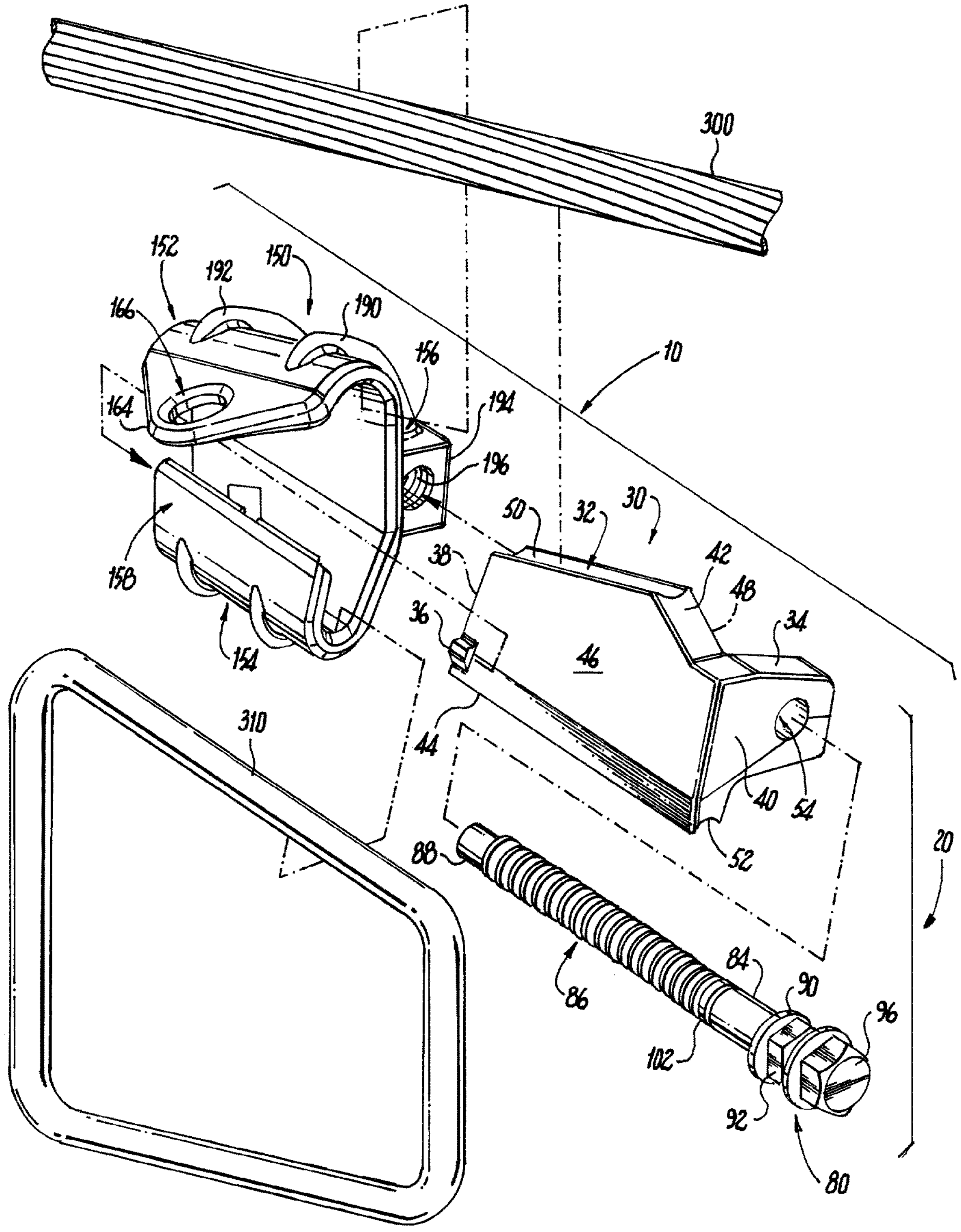
FIG. 2 is an exploded perspective view of the wedge type electrical cable connector assembly of FIG. 1.
Figure 3:
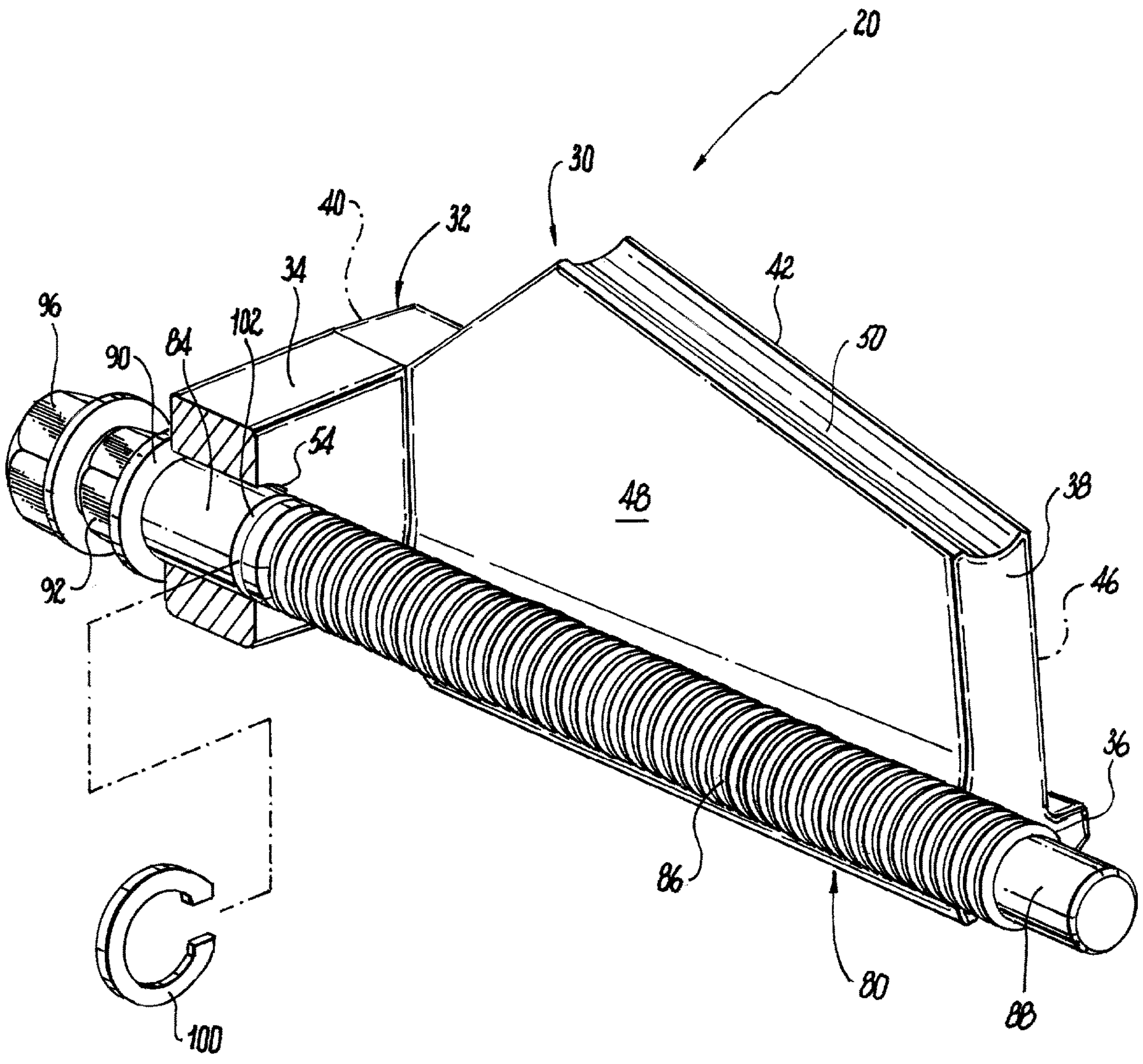
FIG. 3 is a perspective view of a wedge assembly of the wedge type electrical cable connector assembly of FIG. 2.

Referring to FIGS. 2 and 3, the wedge assembly 20 includes a wedge 30 and a fastener 80. The wedge 30 includes a body 32, a fastener holder 34 and a guide rail 36. The body 32 has a front wall 38, a rear wall 40, a top wall 42, a bottom wall 44 and side walls 46 and 48. The wedge body 32 is shaped to fit within the frame 150. At least a portion of the top wall 42 includes a primary contact surface 50, and at least a portion of the bottom wall 44 includes a secondary contact surface 52. The contact surfaces 50 and 52 may be in the form of an elongated recess or groove as shown. The primary contact surface 50 is preferably configured to contact and cooperate with a main conductor 300 positioned in the frame 150, and the secondary contact surface 52 is preferably configured to contact and cooperate with a bail 310 or tap conductor 320 positioned in the frame 150. The fastener holder 34 extends from the body 32 and includes an aperture 54, e.g., a smoothbore aperture, configured and dimensioned to receive the fastener 80 such that the fastener 80 can rotate relative to the aperture 54. In the exemplary embodiment shown, the fastener holder 34 is a flange extends from the body 32 and includes the aperture 54. Preferably, the fastener holder 34 is positioned at or in proximity, e.g., close proximity, to the rear wall 40 of the body 32 and extends from the side wall 48 so that the aperture 54 of the fastener holder 34 is aligned with the bore 196 in the mounting member 194 on the frame 150, seen in FIG. 5, when the wedge assembly 20 is coupled to the frame 150. However, the present disclosure contemplates that the fastener holder 34 can be positioned at any location on the body 32 so long as the aperture 54 of the fastener holder 34 aligns with the bore 196 in the mounting member 194 on the frame 150, seen in FIG. 5, when the wedge assembly 20 is coupled to the frame 150. The guide rail 36 extends from the body 32 and is configured and dimensioned to ride along a track 180, seen in FIG. 9, in the frame 150 when the wedge assembly 20 is inserted into the frame 150 as described below. As shown, the guide rail 36 extends from the side wall 46 of the wedge body 32 and is positioned at or in proximity, e.g., close proximity, to the front wall 38 of the body 32 and at or in proximity, e.g., close proximity, to the bottom wall 44 of the body 32. However, the present disclosure contemplates that the guide rail 36 can be positioned at any location on the body 32 so long as the guide rail 36 aligns with the track 180 in the frame 150 when the wedge assembly 20 is coupled to the frame 150.

Figure 4:
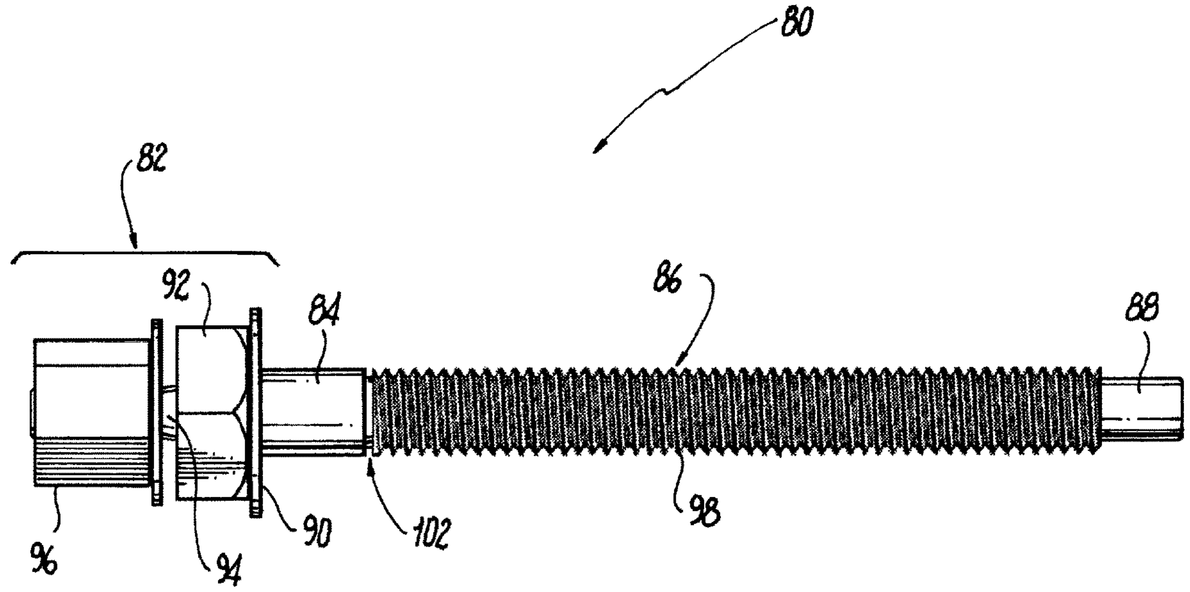
FIG. 4 is a side elevation view of a fastener of the wedge assembly of FIG. 3.

Referring to FIGS. 2-4, the fastener 80 may be any fastener suitable to releasably secure the wedge assembly 20 to the frame 150 as described herein. In the exemplary embodiment shown, the fastener 80 is an elongated bolt having a head portion 82 followed by a shoulder 84, followed by a threaded portion 86. The threaded portion 86 may be followed by an optional non-threaded portion 88. The head portion 82 may be, for example, a breakaway head configuration where a portion of the head shears or breaks-away from the head portion. In other embodiments, the head portion 82 may be a convention hexagonal bolt head configuration. The head portion 82 shown is a breakaway head configuration. Generally, the breakaway head 82 includes washer 90, a head nut 92, a shear stud 94, a cap nut 96 and a retaining ring 100. It is noted that the washer 90 may be a separate member or part of the head nut 92. The washer 90 is used to assist in attaching the fastener 80 to the fastener holder 34 of the wedge body 32 and to permit the fastener 80 to rotate within the aperture 54 of the fastener holder 34. The head nut 92 may be a hexagonal shaped nut that is used when removing the fastener 80 from the frame 150 as described below. The shear stud 94 extends between the head nut 92 and the cap nut 96. The shear stud 94 is a circular structure that may have a tapered cross section, where the narrow portion of the taper is attached to the head nut 92 and the wide portion of the taper is attached to the cap nut 96. The shear stud 94 is configured and dimensioned to shear at or above a threshold torque so that the cap nut 96 shears or breaks away from the head portion 82. The diameters of the narrow portion and wide portion of the shear stud 94 are determined by the desired predetermined torque at which the shear stud 94 is to shear. For example, if the predetermined torque is to be in the range of about 145 inch-lbs. to about 160 inch-lbs., the diameter for the narrow portion of the shear stud 94 may be in the range from about 0.2 inches to about 0.3 inches, and the shear stud 94 tapers outward from the narrow portion at an angle ranging from 5 degrees to about 30 degrees. The cap nut 96 may be a hexagonal shaped nut that is used when securing the main conductor 300 and the bail 310 or the tap conductor 320 to the connector 10 as described herein and that shears or breaks away when tightened sufficient to clamp the main conductor 300 and bail 310 or tap conductor 320 to the connector 10. A more detailed description of a shear type head portion is described in commonly owned U.S. Pat. No. 10,465,732 which is incorporated herein in its entirety by reference.

Continuing to refer to FIGS. 2-4, the shoulder 84 of the fastener 80 is configured and dimensioned to fit within the aperture 54 of the fastener holder 34 when the fastener 80 is attached to the body 32 of the wedge assembly 20. Preferably, the shoulder 84 has a smooth outer surface so that when the shoulder 84 is within the aperture 54, the shoulder 84 can freely rotate relative to the fastener holder 34, which permits the fastener 80 to freely rotate. Between the shoulder 84 and the threaded portion 86 is a retaining groove 102 used to at least partially attach the fastener 80 to the body 32 of the wedge assembly 20. The threading 98 on the outer surface of the threaded portion 86 of the fastener 80 is complementary to the threading of the threaded bore 196 in the mounting member 194 of the frame 150, which acts as a nut. The threading 98 of the threaded portion 86 may be single-lead threading or multi-lead threading, e.g., double-lead, triple-lead or quadruple-lead threading, as is known. In the exemplary embodiment shown, the threading 98 is triple-lead threading. Using triple-lead threading permits more rapid movement of the fastener 80 and thus the wedge assembly 20 within the frame 150 when compared to single-lead threading. As a result, using triple-lead threading reduces the installation time to connect the main conductor 300 and the bail 310 or tap conductor 320 to the connector 10. The optional non-threaded portion 88 of the fastener 80 has a smaller diameter than the threaded portion 86 to facilitate easier insertion of the fastener 80 into the aperture 54 of the fastener holder 34.

The attachment of the fastener 80 to the fastener holder 34 will be described with reference to FIGS. 2-4. Initially, the optional non-threaded portion 88 of the fastener 80 is inserted into the aperture 54 of the fastener holder 34. The non-threaded portion 88 and the threaded portion 86 of the fastener 80 are inserted into the aperture 54 of the fastener holder 34 until the shoulder 84 of the fastener is within the aperture 54. The retaining ring 100, seen in FIG. 3, is then snapped onto the retaining groove 102 in the fastener 80 between the shoulder 84 and the threaded portion 86. At this point, the fastener 80 is releasably attached to the fastener holder 34 of the wedge body 32. It is also noted that the retaining ring 100 also facilitates the removal of the wedge 30 from the frame 150.

Referring again to FIGS. 2, 5, 8 and 9 in this exemplary embodiment, the frame 150 is a C-shaped member or body. The frame 150 has a first conductor guide wall 152, a second conductor guide wall 154, a rear wall 156 between the first conductor guide wall 152 and the second conductor guide wall 154, and a front wall 158 extending from the second conductor guide wall 154 in a direction toward the first conductor guide wall 152. Between the first conductor guide wall 152, the second conductor guide wall 154, the rear wall 156 and the front wall 158 is a wedge receiving channel 160. In the embodiment shown, the first conductor guide wall 152, the second conductor guide wall 154, the rear wall 156, the front wall 158 and the wedge receiving channel 160 form the C-shaped body.

Figure 8:
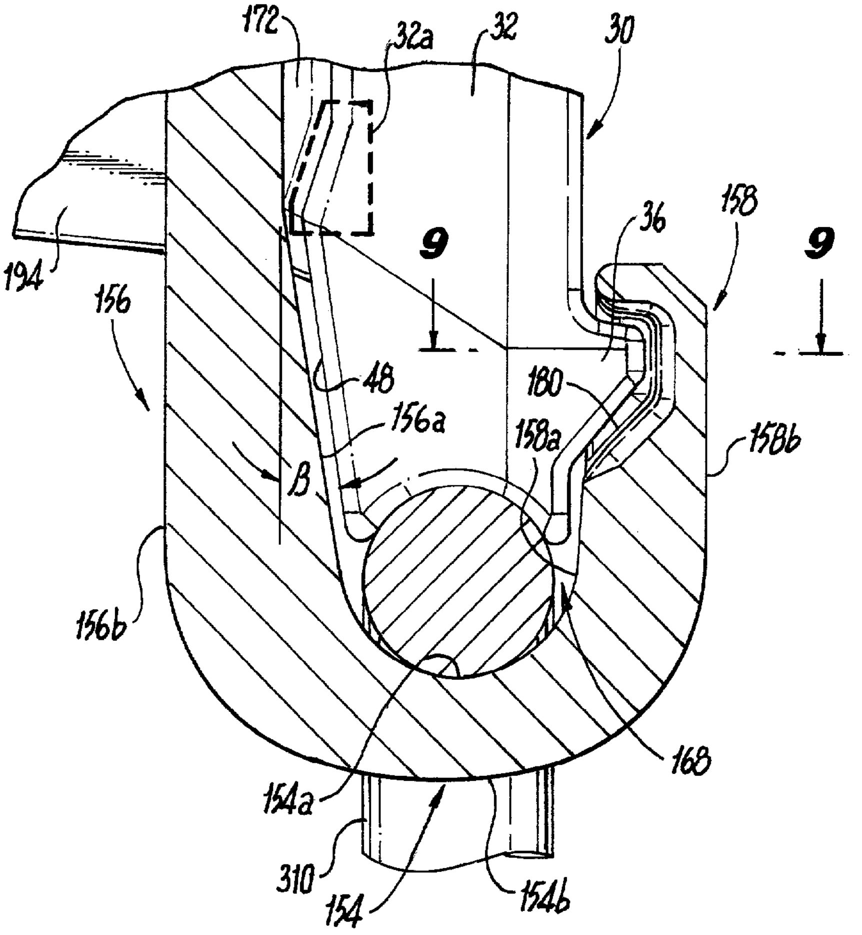
FIG. 8 is a cross-sectional view of the wedge type electrical cable connector assembly and stirrup of FIG. 6 taken from line 8-8, illustrating the wedge assembly clamping the stirrup to the frame.

The first conductor guide wall 152 has an inner surface **152*a* and an outer surface 152*b*. The inner surface 152*a* of the first conductor guide wall 152 is shaped, e.g., arcuate shaped, to form a first conductor groove 162 that is configured and dimensioned to receive or fit at least partially around a main conductor 300. Extending from a free end 152*c* of the first conductor guide wall 152 is a conductor guide member 164. The conductor guide member 164 may be, for example, a duck-bill type guide member or other shape guide member suitable to guide the main conductor 300 through the wedge receiving channel 160 into engagement with the first conductor groove 162. The conductor guide member 164 may include an aperture 166 that can be used to couple an extendable reach tool, such as a hot stick (not shown), to the frame 150 of the connector 10 during, for example, installation. The second conductor guide wall 154 has an inner surface 154*a* and an outer surface 154*b*. The inner surface 154*a* of the second conductor guide wall 154 is shaped, e.g., arcuate shaped, to form a second conductor groove 168 that is configured and dimensioned to receive or fit at least partially around the bail 310, seen in FIG. 1, or in the case of the wedge type tap connector in FIG. 1A a tap conductor 320. The rear wall 156 has an inner surface 156*a* and an outer surface 156*b*. In this exemplary embodiment, the inner surface 156*a* of the rear wall 156 has an asymmetrical shape, and the outer surface 156*b* of the rear wall 156 is substantially flat. The asymmetrical shape of the inner surface 156*a* of the rear wall 156 is substantially flat from about the junction between the inner surface 152*a* of the first conductor guide wall 152 to about a central region 170 represented roughly by the dashed line 170 along the rear wall 156. At the central region 170 of the rear wall 156, the inner surface 156*a* angles inwardly toward the front wall 158 as seen in FIG. 8. The angle "β" reduces the size of the inner surface 154*a* of the second conductor guide wall 154 so that the second conductor groove 168 is configured to receive the bail 310, seen in FIG. 1, or a tap conductor, seen in FIG. 1A. The angle "β" of the inner surface 156*a* of the rear wall 156 also conforms to a shape of the wedge body 32 of the wedge 30 described above. Extending from the inner surface 156*a* of the rear wall 156 is a retaining pad 172 that interacts with the wedge body 32 of the wedge 30 to also facilitate the retention of the wedge 30 within the frame 150. More specifically, the wedge body 32 has an offset portion 32*a*, seen in FIG. 8, that is configured and dimensioned to engage the retaining pad 172 such that friction between the retaining pad and the side wall 48 helps to retain the wedge 30 within the wedge receiving channel 160 of the frame 150**.

The front wall 158 has an inner surface **158*a* and an outer surface 158*b*. In this exemplary embodiment, the front wall 158 includes a track 180 accessible from the inner surface 158*a* of the front wall 158. The track 180 is configured and dimensioned to receive the guide rail 36 on the wedge body 32 of the wedge 30. As noted above, the guide rail 36 is configured and dimensioned to fit within the track 180 so that the guide rail 36 can glide or slide along the track 180 guiding movement of the wedge 30 along the track 180 between a conductor receiving position, seen in FIG. 6, and a conductor clamping position, seen in FIG. 7. It is noted that the conductor clamping position may be different depending upon the size of the main conductor 300, the bail 310 and/or the tap conductor 320. Thus, for smaller size conductors and/or bail, the conductor clamping position may be at a point where the wedge 30 is further within the frame 150 than with larger conductors. The guide rail 36 and track 180 are also used to also facilitate the retention of the wedge 30 within the frame 150. At one end of the track 180 is a stop 182, seen in FIGS. 5 and 9, used to engage the guide rail 36 extending from the wedge body 32 to stop the movement of the wedge 30 in the wedge receiving channel 160 so as to prevent the wedge 30 from exiting the second end of the frame 150 having the length "L2," seen in FIG. 7, as the wedge 30 is being moved in the direction of the conductor receiving position, seen in FIG. 6. The outer surface 158*b* of the front wall 158 is substantially flat but could be in any shape. It is noted that although the guide rail 36 is described herein as being on the wedge body 32 and the track 180 is described as being in the front wall 158 of the frame 150, the present disclosure contemplates that the guide rail 36 may be on the frame 150, e.g., the inner surface 156*a* of the rear wall 156, and the track 180 may be in the wedge body 32, e.g., the side wall 48** of the wedge body.

Referring again to FIG. 5, the frame 150 may also include one or more stiffening ribs that provide structural stiffness to further assist the frame 150 in withstanding the forces applied by the operation of the wedge assembly 20. The one or more ribs may be integrally or monolithically formed into the frame 150 or the one or more ribs may be secured to the frame using welds, mechanical fasteners or adhesives. In the exemplary embodiment shown in FIG. 5, there are two ribs 190 and 192 monolithically formed into and extending from the frame 150. More specifically, the first rib 190 extends along a portion of the outer surface 152*b* of the first conductor guide wall 152, along the outer surface 156*b* of the rear wall 156 and along a portion of the outer surface 154*b* of the second conductor guide wall 154. The first rib 190 may be symmetrically or asymmetrically shaped in order to provide the additional structural integrity sufficient to withstand the forces applied by the operation of the wedge assembly 20. In the embodiment shown in FIG. 5, the first rib 190 is asymmetrically shaped such that it has a narrow depth at the outer surface 152*b* of the first conductor guide wall 152 and the outer surface 154*b* of the second conductor guide wall 154 that gradually increases as the rib 190 traverses along the outer surface 156*b* of the rear wall 156 toward the center region 170 of the rear wall 156. At the center region 170 of the rear wall 156 is the mounting member 194 used to couple the wedge assembly 20 to the frame 150. The mounting member 194 may be integrally or monolithically formed into the rib 190 and/or the rear wall 156, or the mounting member 194 may be secured to the rib 190 and/or the rear wall 156 using, for example, welds, mechanical fasteners or adhesives. The mounting member 194 is provided to couple the wedge assembly 20 to the frame 150 and to facilitate the drive movement of the wedge 30 within the wedge receiving channel 160. The mounting member 194 may be a flange having a bore for receiving the fastener 80. In the exemplary embodiment shown, the mounting member 194 is a square shaped flange having a threaded bore 196 configured and dimensioned to receive the threaded portion 86 of the fastener 80 of the wedge assembly 20.

Figure 5:
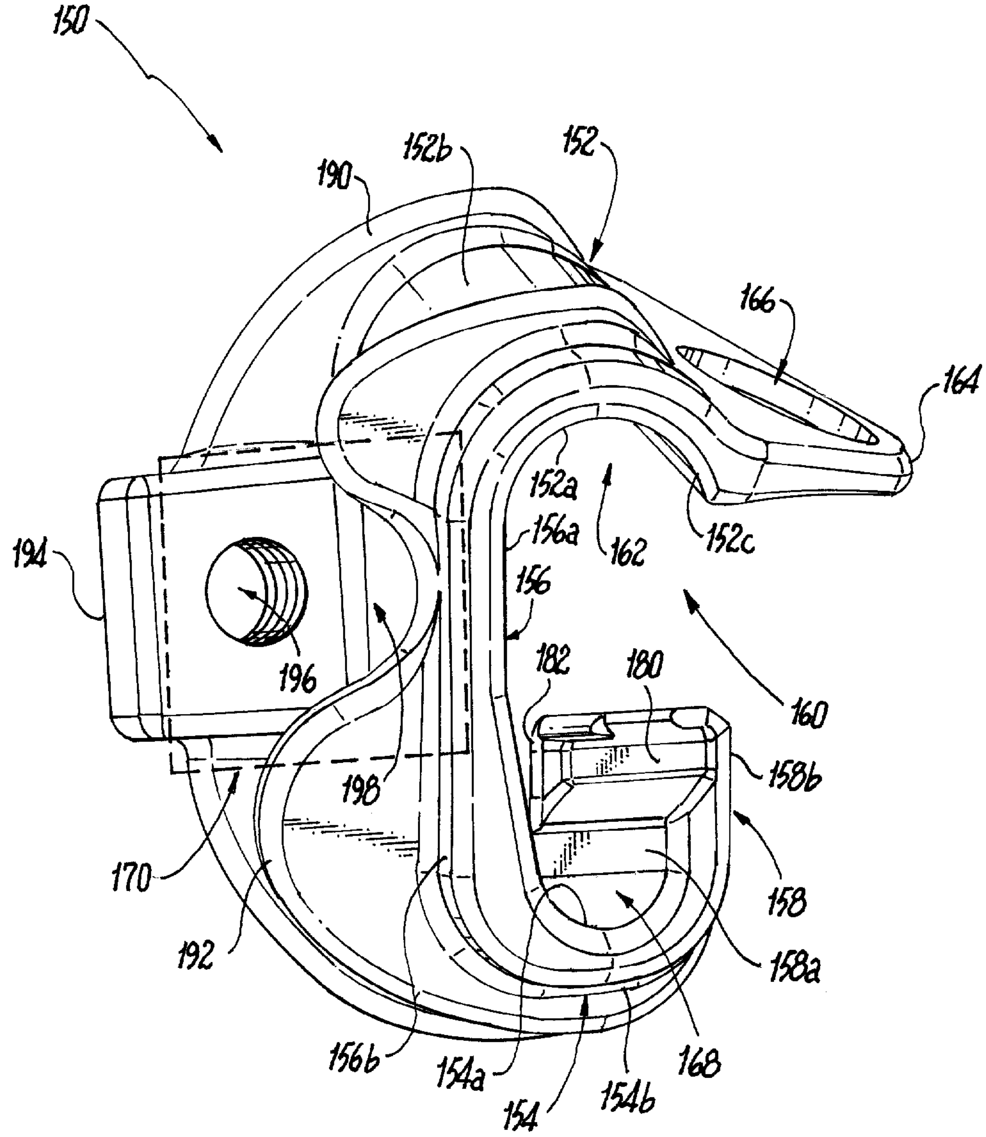
FIG. 5 is an end perspective view of the frame of the wedge type electrical cable connector assembly of FIG. 2.

Continuing to refer to FIG. 5, the second rib 192 is asymmetrically shaped such that it has a narrow depth at the outer surface 152*b* of the first conductor guide wall 152 and the outer surface 154*b* of the second conductor guide wall 154 that gradually increases as the rib 192 traverses along the outer surface 156*b* of the rear wall 156 toward the center region 170 of the rear wall 156. At the center region 170 of the rear wall 156 the second rib 192 has an indent or groove 198 used to allow the threaded portion 86 and optional non-threaded portion 88 of the fastener 80 to pass the second rib 192. The ribs 190 and 192 may also help to limit a lineman's hands or safety gloves from contacting the outer surface 156*b* of the rear wall 156 and the fastener 80 so as to limit and possibly prevent any grease or other substances on the fastener 80 and the outer surface 156*b* of the rear wall 156 from contacting the lineman's hands or safety gloves.

Figure 6:
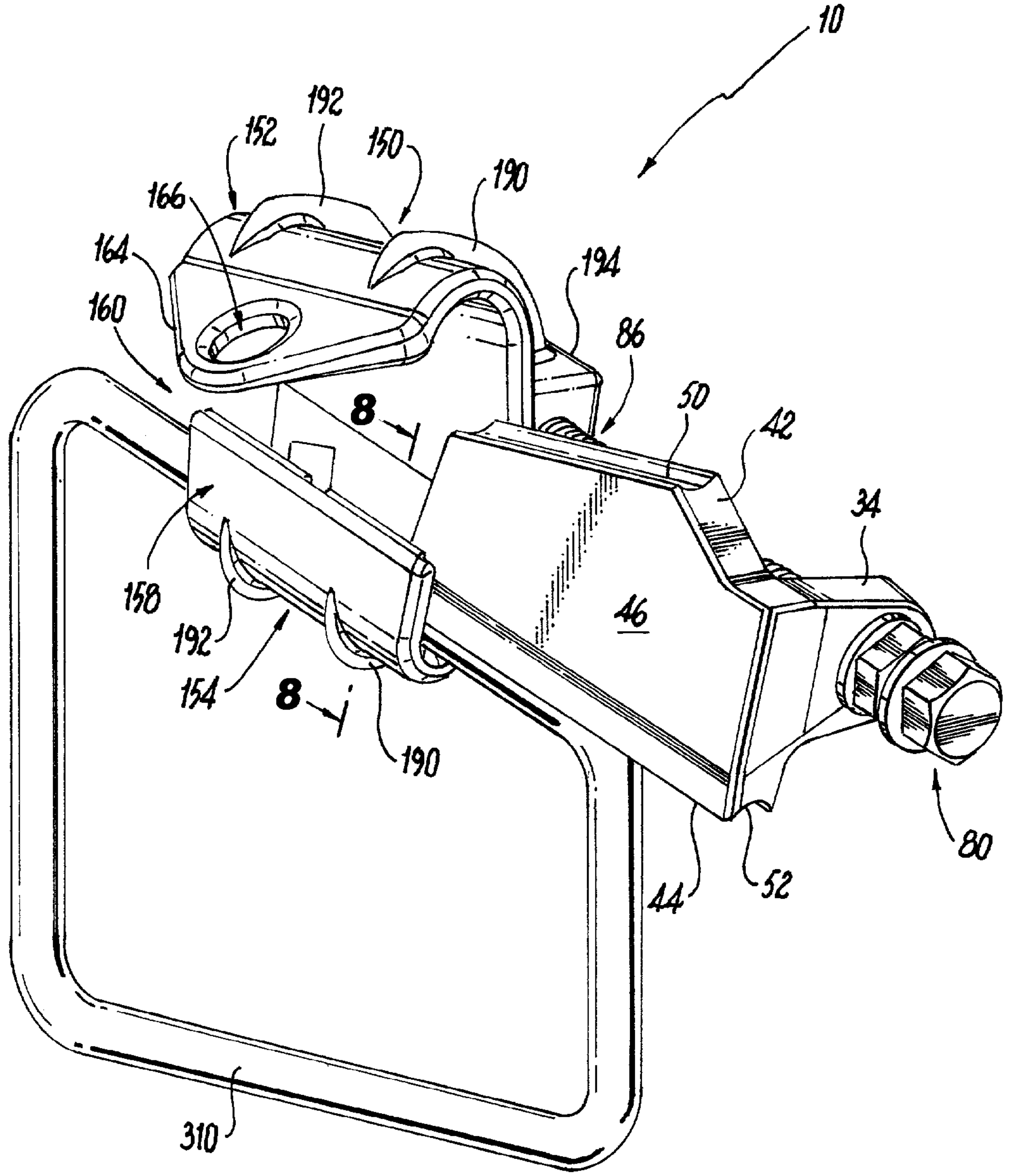
FIG. 6 is a perspective view of the wedge type electrical cable connector assembly and stirrup of FIG. 1, illustrating the wedge assembly coupled to the frame with the wedge assembly in a conductor receiving position.
Figure 7:
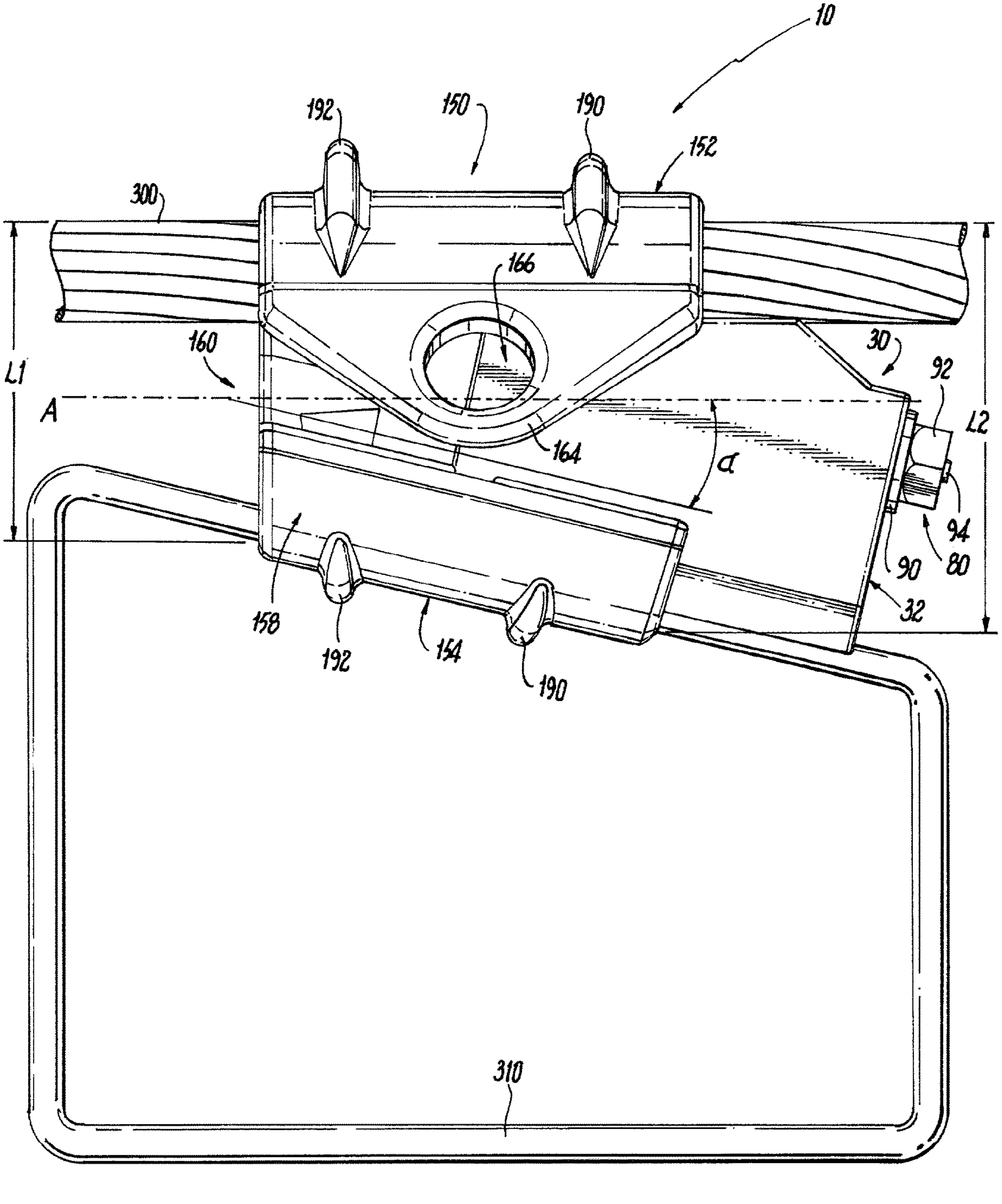
FIG. 7 is a perspective view of the wedge type electrical cable connector assembly and stirrup of FIG. 6, illustrating the wedge assembly coupled to the frame with the wedge assembly in a conductor clamping position and clamping a main conductor and bail to the wedge type electrical cable connector assembly.
Figure 9:
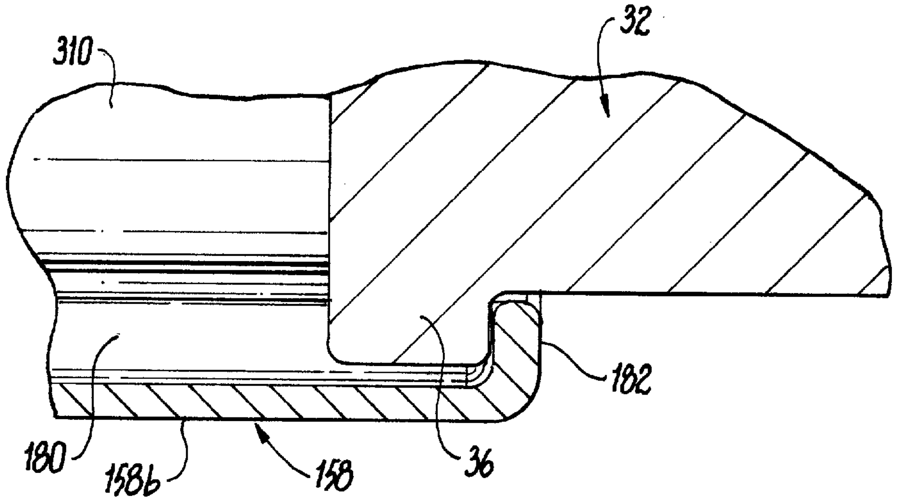
FIG. 9 is a cross-sectional view of the wedge type electrical cable connector assembly of FIG. 8 taken from line 9-9, illustrating a stop on the frame used to prevent certain movement of a guide rail of the wedge assembly.

Referring to FIGS. 7-9, as noted above, the connector 10 is a wedge type connector having a wedge assembly 20 and a frame 150 that are operatively coupled or interconnected as shown in FIGS. 6 and 7 so that a main conductor 300 and bail 310 or tap conductor 320 can be wedged in the connector 10 so as to clamp the main conductor 300 and bail 310 or tap conductor 320 to the connector 10. In order for the wedge assembly 20 to wedge or clamp the main conductor 300, bail 310 and/or tap conductor 320 within the frame 150, the wedge receiving channel 160 at a first end of the frame 150 has a length "L1" and the wedge receiving channel 160 at a second end of the frame 150 has a length "L2." In the embodiment shown, the length "L1" is less than the length "L2" such that one or both of the conductor guide walls 152 and 154 are tapered relative to a longitudinal axis "A" of the frame 150. In the embodiment shown, the second conductor guide wall 154 is at an angle "a" relative to a longitudinal axis "A" of the frame 150. The angle "a" may be in the range of about 5 degrees and about 25 degrees. To operatively couple the wedge assembly 20 to the frame 150, the second conductor guide wall 154 has an inner surface 154*a* and an outer surface 154*b*.

The electrical and mechanical connecting of a main conductor 300 and bail 310 to the connector 10 will be described with reference to FIGS. 1, 6 and 7. Initially, the bail 310 is passed through the wedge receiving channel 160 so that the bail 310 rests in the second conductor groove 168 and is in contact with the inner surface 154*a* of the second conductor guide wall 154. The front wall 38 of the body 32 of the wedge assembly 20 is then inserted into the second end of the frame 150 having the length "L2," as seen in FIG. 6, so that the secondary contact surface 52 is in contact with the bail 310, and the guide rail 36 of the wedge body 32 is within the track 180 in the front wall 158. The non-threaded portion 88 of the fastener 80 is inserted into the threaded bore 196 in the mounting member 194 on the frame 150 and the cap nut 96 is rotated causing the threaded portion 86 of the fastener 80 to begin to be threaded into the bore 196 holding the wedge assembly 20 within the frame 150. At this point the wedge assembly 20 is in the conductor receiving position. With the wedge assembly 20 in the conductor receiving position, an extendable reach tool (not shown) is attached to the conductor guide member 164 via the aperture 166. The extendable reach tool is then lifted toward and slightly over the main conductor 300 so that the conductor guide member 164 can guide the main conductor 300 through the wedge receiving channel 160 and into the first conductor groove 162 so that the main conductor 300 contacts the inner surface 152*a* of the first conductor guide wall 152. The same or another extendable reach tool (not shown) is then mated with the cap nut 96 on the fastener 80 and the cap nut 96 is rotated causing the wedge 30 to move toward the conductor clamping position, as seen in FIG. 7. As the wedge 30 moves toward the conductor clamping position, the primary contact surface 50 of the wedge body 32 engages the main conductor 300. Further movement of the wedge 30 toward the conductor clamping position increases the friction exerted onto the main conductor 300 and bail 310 by the frame 150 and wedge 30 increasing the torque needed to turn the cap nut 96. When the torque needed to drive the wedge 30 further in the direction of the conductor clamping position exceeds the predetermined torque, the cap nut 96 breaks away from the head portion 82 at the shear stud 94 leaving the head nut 92, as seen in FIG. 7. At this point, the main conductor 300 and bail 310 are secured to the connector 10. To remove the wedge 30 from the frame 150, the fastener 80 is untightened. As the fastener 80 is untightened, the retaining ring 100 engages the fastener holder 34 so that the fastener holder 34 and thus the wedge 30 begin to move out of the frame 150. Further untightening of the fastener 80 continues the withdrawal of the wedge 30 from the frame 150.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A wedge type electrical connector assembly comprising:
   - a frame having a first conductor guide wall, a second conductor guide wall, a rear wall between the first conductor guide wall and the second conductor guide wall, and a front wall extending from the second conductor guide wall in a direction toward the first conductor guide wall, the guide walls, rear wall and front wall forming a wedge receiving channel, the frame having a recess accessible from the wedge receiving channel and extending from a first end of the wedge receiving channel to a stop member positioned adjacent a second end of the wedge receiving channel, and the frame having a mounting member extending therefrom; and
   - a wedge assembly having a wedge and a fastener, the wedge including:
     - a body adapted to fit within the wedge receiving channel of the frame, the body having a top wall with a primary contact surface and a bottom wall with a secondary contact surface, a first side wall between the top wall and the bottom wall and a second side wall between the top wall and the bottom wall;
     - a fastener holder extending from the body and aligned with the mounting member of the frame when the body is at least partially positioned within the wedge receiving channel, wherein the fastener is movably attached to the fastener holder; and
     - a guide rail extending from the body and adapted to interact with the recess to guide the body within the wedge receiving channel.

2. The wedge type electrical connector assembly according to claim 1, further comprising a bail positioned within the wedge receiving channel adjacent the second conductor guide wall.

3. The wedge type electrical connector assembly according to claim 1, wherein the fastener comprises an elongated bolt having a head portion, a shoulder and a threaded portion.

4. The wedge type electrical connector assembly according to claim 3, wherein the head portion of the fastener comprises a breakaway head.

5. The wedge type electrical connector assembly according to claim 4, wherein the breakaway head comprises a head nut, a shear stud and a cap nut.

6. The wedge type electrical connector assembly according to claim 3, wherein threading of the threaded portion comprises single-lead threading or multi-lead threading.

7. The wedge type electrical connector assembly according to claim 1, wherein a first end of the frame has a first length, wherein a second end of the frame has a second length, and wherein the first length is less than the second length.

8. The wedge type electrical connector assembly according to claim 1, wherein the recess is in the front wall of the frame, and the guide rail is positioned at or in close proximity to a front wall of the body.

9. The wedge type electrical connector assembly according to claim 1, wherein the mounting member of the frame comprises a flange having a bore for receiving the fastener.

10. A wedge type electrical connector assembly comprising:
   - a C-shaped frame having a first conductor guide wall, a second conductor guide wall, a rear wall between the first conductor guide wall and the second conductor guide wall, and a front wall extending from the second conductor guide wall in a direction toward the first conductor guide wall, the guide walls, rear wall and front wall forming a wedge receiving channel, the frame having a recess extending from a first end of the wedge receiving channel to a stop member positioned adjacent a second end of the wedge receiving channel, and the rear wall having a mounting member extending therefrom; and
   - a wedge assembly having a wedge and a fastener, the fastener having breakaway head portion that includes a head nut, a shear stud and a cap nut, and the wedge including:
     - a body adapted to fit within the wedge receiving channel of the frame, the body having a top wall with a primary contact surface and a bottom wall with a secondary contact surface, a first side wall between the top wall and the bottom wall and a second side wall between the top wall and the bottom wall;
     - a fastener holder extending from the body and aligned with the mounting member on the rear wall when the body is at least partially positioned within the wedge receiving channel, wherein the fastener is movably attached to the fastener holder; and
     - a guide rail extending from the body and adapted to interact with the recess to guide movement of the body within the wedge receiving channel.

11. The wedge type electrical connector assembly according to claim 10, further comprising a bail positioned within the wedge receiving channel adjacent the second conductor guide wall.

12. The wedge type electrical connector assembly according to claim 10, wherein the fastener comprises an elongated bolt having the breakaway head portion, a shoulder and a threaded portion.

13. The wedge type electrical connector assembly according to claim 12, wherein threading of the threaded portion comprises single-lead threading or multi-lead threading.

14. The wedge type electrical connector assembly according to claim 10, wherein a first end of the frame has a first length, wherein a second end of the frame has a second length, and wherein the first length is less than the second length.

15. The wedge type electrical connector assembly according to claim 10, wherein the recess is in the front wall of the frame and the guide rail is positioned at or in close proximity to a front wall of the body.

16. The wedge type electrical connector assembly according to claim 10, wherein the mounting member of the frame comprises a flange having a bore for receiving the fastener.

17. A wedge type electrical connector assembly comprising:
   - a frame having a first conductor guide wall, a second conductor guide wall, a rear wall between the first conductor guide wall and the second conductor guide wall, and a front wall extending from the second conductor guide wall in a direction toward the first conductor guide wall, the guide walls, rear wall and front wall forming a wedge receiving channel, the frame having a recess extending from a first end of the wedge receiving channel to a stop member positioned adjacent a second end of the wedge receiving channel, and the frame having a mounting member extending therefrom; and
   - a wedge assembly having a wedge and a fastener, the wedge including:
     - a wedged-shaped body adapted to fit within the wedge receiving channel of the frame, the body having a top wall with a primary contact surface and a bottom wall with a secondary contact surface, a first side wall between the top wall and the bottom wall and a second side wall between the top wall and the bottom wall;

a fastener holder extending from the first side wall of the body and aligned with the mounting member of the frame when the body is at least partially positioned within the wedge receiving channel, wherein the fastener is movably attached to the fastener holder; and a guide rail extending from the body and adapted to interact with the recess to guide the body within the wedge receiving channel.

18. The wedge type electrical connector assembly according to claim 17, wherein the fastener comprises an elongated bolt having a head portion, a shoulder and a threaded portion.

19. The wedge type electrical connector assembly according to claim 18, wherein the head portion of the fastener comprises a breakaway head.

20. The wedge type electrical connector assembly according to claim 19, wherein the breakaway head comprises a head nut, a shear stud and a cap nut.

21. The wedge type electrical connector assembly according to claim 18, wherein threading of the threaded portion comprises single-lead threading or multi-lead threading.

22. The wedge type electrical connector assembly according to claim 17, wherein a first end of the frame has a first length, wherein a second end of the frame has a second length, and wherein the first length is less than the second length.

23. The wedge type electrical connector assembly according to claim 17, wherein the recess is in the front wall of the frame and the guide rail is positioned at or in close proximity to a front wall of the body.

24. The wedge type electrical connector assembly according to claim 17, wherein the mounting member of the frame comprises a flange having a bore for receiving the fastener.

25. The wedge type electrical connector assembly according to claim 17, further comprising a bail positioned within the wedge receiving channel of the frame adjacent the second conductor guide wall.

* * * * *